United States Patent [19]
Voss et al.

[11] Patent Number: 5,573,345
[45] Date of Patent: Nov. 12, 1996

[54] CONNECTION OF STRUCTURAL COMPONENT PARTS IN ADJUSTING DEVICES FOR SEATS, INPARTICULAR FOR MOTOR VEHICLES SEATS

[75] Inventors: Heinz Voss, Leverkusen; Dirk Angermann, Cologne; Harald Griebe, Rockenhausen; Hans-Juergen Honecker, Remscheid, all of Germany

[73] Assignee: Keiper Recaro GmbH & Co., Remscheid, Germany

[21] Appl. No.: 336,171

[22] Filed: Nov. 8, 1994

[30]     Foreign Application Priority Data

Nov. 22, 1993 [DE] Germany .......................... 43 39 508.2

[51] Int. Cl.$^6$ .............................. B25G 3/34; F16B 11/00; B60N 2/02; B23K 9/00
[52] U.S. Cl. ..................... 403/271; 403/265; 403/270; 403/334; 297/362; 297/363; 228/165; 228/173.1; 228/174; 219/98; 219/99
[58] Field of Search ................................ 403/265, 270, 403/179, 271, 267, 333, 334; 297/362, 363; 228/159, 165, 168, 173.1, 174; 219/98, 99

[56]            References Cited
            U.S. PATENT DOCUMENTS

| 3,020,987 | 2/1962 | Schaurte | 403/179 |
| 3,631,585 | 1/1972 | Stamm | 403/270 X |
| 3,683,148 | 8/1972 | Boyko et al. | 219/99 X |
| 4,469,376 | 9/1984 | Pelz | 297/362 |
| 5,441,241 | 8/1995 | McKim | 256/65 |

Primary Examiner—Kenneth J. Dorner
Assistant Examiner—Bruce A. Lev
Attorney, Agent, or Firm—McAulay Fisher Nissen Goldberg & Kiel, LLP

[57]                 ABSTRACT

The connection of structural component parts in adjusting devices for seats, in particular for motor vehicle seats, is disclosed. In connecting structural component parts for adjusting devices for seats, the structural component parts to be rigidly connected with one another are welded in their connecting region. In order to prevent distortion of these structural component parts caused by the welding process, one structural component part has at least one bevel which projects toward the connection side and can be pressed into at least one recess of the other structural component part during a capacitor impulse welding process, this recess substantially conforming to the bevel with respect to shape and dimensions.

21 Claims, 3 Drawing Sheets

5,573,345

CONNECTION OF STRUCTURAL COMPONENT PARTS IN ADJUSTING DEVICES FOR SEATS, INPARTICULAR FOR MOTOR VEHICLES SEATS

BACKGROUND OF THE INVENTION a) Field of the Invention

The invention is directed to a connection of structural component parts in adjusting devices for seats, in particular for motor vehicle seats, in which the structural component parts to be rigidly connected with one another are welded in their connecting region.

b) Background Art

The prior art known from DE 33 03 069 C2 discloses a vehicle seat in which the sides or cheeks of the seat part and those of the backrest frame are connected with one another with reinforcing plates and articulated parts by means of rivets. At least the cheeks of the backrest frame have beads in the region of their connection flanges at the articulated part and at the reinforcing plate, which beads abut at these structural component parts and are welded thereto. As a rule, open arc welding is used for this welding process and is carried out by means of a metal electrode. It is well known that high temperatures occur in the structural component parts to be welded and can lead to stresses and warping in thin-walled structural component parts so that it may be necessary to subject the structural component parts to heat treatment to relieve stresses.

A motor vehicle seat with seat rails arranged on both longitudinal sides of the seat is known from the prior art in DE 32 46 564 A1. The running rails of the seat rails are formed by two section plates which are joined to form a rail having an approximately T-shaped cross section. One section plate forms a support section and the other section plate forms a retaining section, these two section plates being connected with one another by spot welding to form the T-shaped rail. Further, in order to connect the articulated parts to the backrest frame on the one hand and to the running rail on the other hand, these structural component parts are connected with one another by spot welding. As was mentioned above with respect to arc welding, spot welding also leads to an intensive heating of the structural component parts to be connected with one another so that stresses result from the welding process after the connected structural component parts have cooled. These stresses reduce the stability of such structural component parts under load, particularly in a crash situation.

OBJECT AND SUMMARY OF THE INVENTION

The primary object of the present invention is to provide a connection of structural component parts through welding in which the connected structural component parts remain extensively free from thermal stresses resulting from welding.

This object is met according to the invention in that one structural component part has at least one facet or bevel which projects toward the connection side and can be pressed into at least one recess of the other structural component part during a capacitor impulse welding process, this recess substantially conforming to the bevel with respect to shape and dimensions. Capacitor impulse welding is suitable for butt-welding of structural component parts fitted up in the manner described above, since the welding energy is obtained from a capacitor discharge. During interruptions in the welding process, the capacitor is charged to the necessary level of dc voltage which discharges in the brief current-on period during the welding process. Since a high energy density is released in the welding region only for an extremely brief period of time, there is no intensive heating and accordingly also no distortion of the welded structural component parts so that greater dimensional stability is also achieved, especially since the importance of good thermal conductivity of the workpieces is only secondary. Further, there is no oxidation in the welds. In butt welding by means of capacitor discharge, the joining of the structural component parts to be welded is controlled in such a way that the region of the structural component parts to be connected is melted at the weld location due to the high current strength and high resistance. During this period, the bevel of one structural component part can be pressed into the recess of the other structural component part so as to close in a positive engagement. This can be effected, for example, in that the structural component parts to be connected are clamped in a mechanical spring-actuated contact pressing device. There is a very high transmission of force in the welded region, to which the positive engagement also contributes.

According to a feature of the invention for the purpose of optimizing the welding process, the bevel has a conical circumferential surface area which tapers from the emergence cross section or initial cross section to an end face which is smaller than the initial cross section of the bevel, while the recess receiving the bevel has a somewhat larger cross section than the end face of the bevel. However, the cross section of the recess is smaller than the initial cross section of the bevel. For technical considerations relating to manufacture, it can be advantageous if the bevel of one structural component part and the recess of the other structural component part have a circular circumference. However, this is not strictly necessary; and the bevel of one structural component part and the recess of the other structural component part can also have a polygonal circumference.

According to another feature of the invention, one structural component part has a plurality of bevels arranged at a distance from one another and the other structural component part has an identical number of recesses arranged in the same manner corresponding to the arrangement of the bevels so that the structural component parts can be fastened to one another along a longer connecting region if necessary.

In an advantageous development of the invention, a collecting pocket is arranged in the region of the bevel on at least one of the two structural component parts to be connected for receiving material which is melted during the welding process and displaced when pressing the parts together. The collecting pocket can advantageously be constructed as the annular depression surrounding the recess in the structural component part forming the mating part to be joined and can be arranged on the side facing the bevel, i.e., in such a way that the annular depression proceeds in the radial direction from the recess in this structural component part. However, it is also possible to construct the annular depression as a groove which is recessed into the structural component part at a radial distance from the recess.

In order to achieve a longer weld seam than would be possible with a circular bevel without requiring more space and while improving the strength of the seam, according to an advantageous feature of the invention, the bevel at one structural component part has a triangular circumference with a conical outer surface area, while the recess at the other structural component part is constructed as a triangular hole corresponding to the bevel.

The bevel advantageously has a hole in its center so that less heat is carried off during the welding process and so that the bevel can be manufactured in a pressing process. The bevel is stamped out of the structural component part as a projecting conical collar. According to another feature of the invention, the structural component part has a circumferential annular depression at the base of the projecting collar forming the bevel which serves as a collecting pocket for receiving the material displaced during welding. This annular depression can be pressed into the structural component part having the bevel at the same time that the bevel is pressed out.

To produce the pressed out bevel, a hole is first punched into the structural component part at the site of the bevel and the wall region of the structural component part surrounding the hole is pressed out at the same time or immediately thereafter as a conically projecting collar. An annular depression surrounding the bevel and forming the collecting pocket is pressed in at the base of the collar at the same time or in a subsequent step. The connection of the structural component parts can then be produced in that one structural component part is pressed against the other structural component part in such a way that its bevels engage in the recesses of this other structural component part while maintaining a clamping force and a capacitor discharge which is then effected in the structural component parts melts the contacting regions between the bevels and recesses and, during this fusing process, the structural component parts are guided into their final position due to the contact pressing force being exerted on them.

The invention is shown in the drawing by way of an embodiment example and is explained in more detail in the following.

DESCRIPTION OF THE PREFERRED EMBODIMENTS

Figure 3:
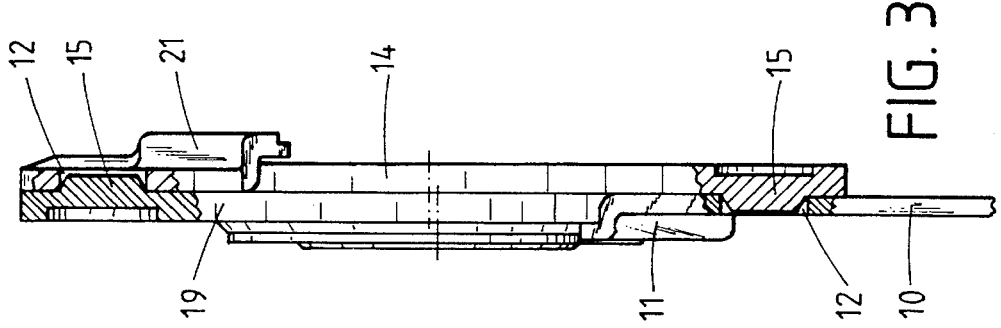
FIG. 3 shows the connected structural component parts after the welding process in partial section as viewed in the direction of arrow III in FIG. 1.

It is noted first that the drawings show only those structural component parts which are significant for their connection with one another or which are essential to an understanding of the invention. For example, the drawing does not show the eccentric swivel axle controlling the engagement of the toothed articulated parts or the actuating members and transmission members of this eccentric swivel axle. It is also expressly noted that the illustrative connections shown in the drawings represent only some of many possibilities and the connection of structural component parts is not limited to those structural component parts used in articulated fittings. For example, the structural component parts of devices for longitudinal adjustment of seats, vertical adjustment, adjustment of armrests and the like and structural component parts of the backrest frame and partial frame of the seat can also be connected with one another in the manner disclosed by the invention.

The side cheek 10 of a seat part shown in the drawings has an arc-shaped bent portion 11 in its upper region. Two recesses 12 which can be circular, for example, are arranged at a distance from one another below the bent portion 11. The structural component part 14 which is formed as an articulated part with a stamped out spur gear 13 has bevels 15 which are arranged at a distance from the recesses 12, and have the shape of a truncated cone and are stamped out of structural component part 14. The conical circumferential surface 16 of every bevel 15 narrows in diameter toward the end face 18 proceeding from the initial cross section 17 of the bevel 15. This end face 18 is smaller than the cross section of the recess 12, whose cross section is in turn somewhat smaller than the initial cross section 17 of every bevel 15. The internal ring gear 20 of another structural component part 19 constructed as an articulated part engages with the spur gear 13. This structural component part 19 also has two bevels 15 which are arranged at a distance from one another and are constructed in the manner described above and have end faces 18 whose cross section is smaller than their initial cross section 17 proceeding from structural component part 19. The bevels 15 of structural component part 19 can be inserted into recesses 12 of a structural component part 21 constructed as a retaining section. When connected in the position shown in FIG. 3, the bent portion 11 of the structural component part constructed as a side cheek 10 and the structural component part 21 constructed as a retaining section ensure the axial connection of structural component parts 14 and 19 which serve as articulated parts. The structural component part 14 having the spur gear 13 and serving as an articulated part has a bore hole 22 which is disposed concentrically to the spur gear and, in the embodiment example shown in the drawing, is somewhat larger than the bore hole 23 in structural component part 19 which likewise forms an articulated part. The bore hole 23 is arranged concentrically to the internal ring gear 20. In the embodiment example shown in the drawing, the number of teeth of the internal ring gear 20 is greater by at least one tooth than the number of teeth of the spur gear 13 and the dedendum or base circle of the internal ring gear 20 is greater than the addendum or outer diameter circle of the spur gear 13 by at least the whole depth of a tooth. In this way, the bore hole 22 receives the eccentric portion of a swivel axle, not shown.

Figure 2:
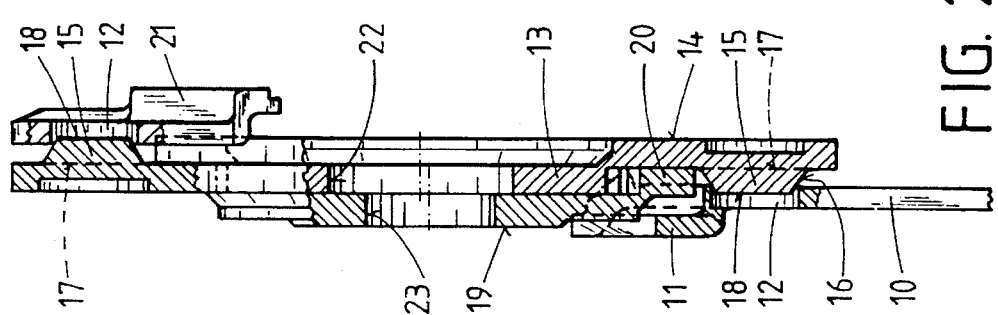
FIG. 2 shows the articulated fitting of FIG. 1 in partial section according to line II—II in FIG. 1, the structural component parts to be connected are located in the position immediately before the start of the welding process.
Figure 1:
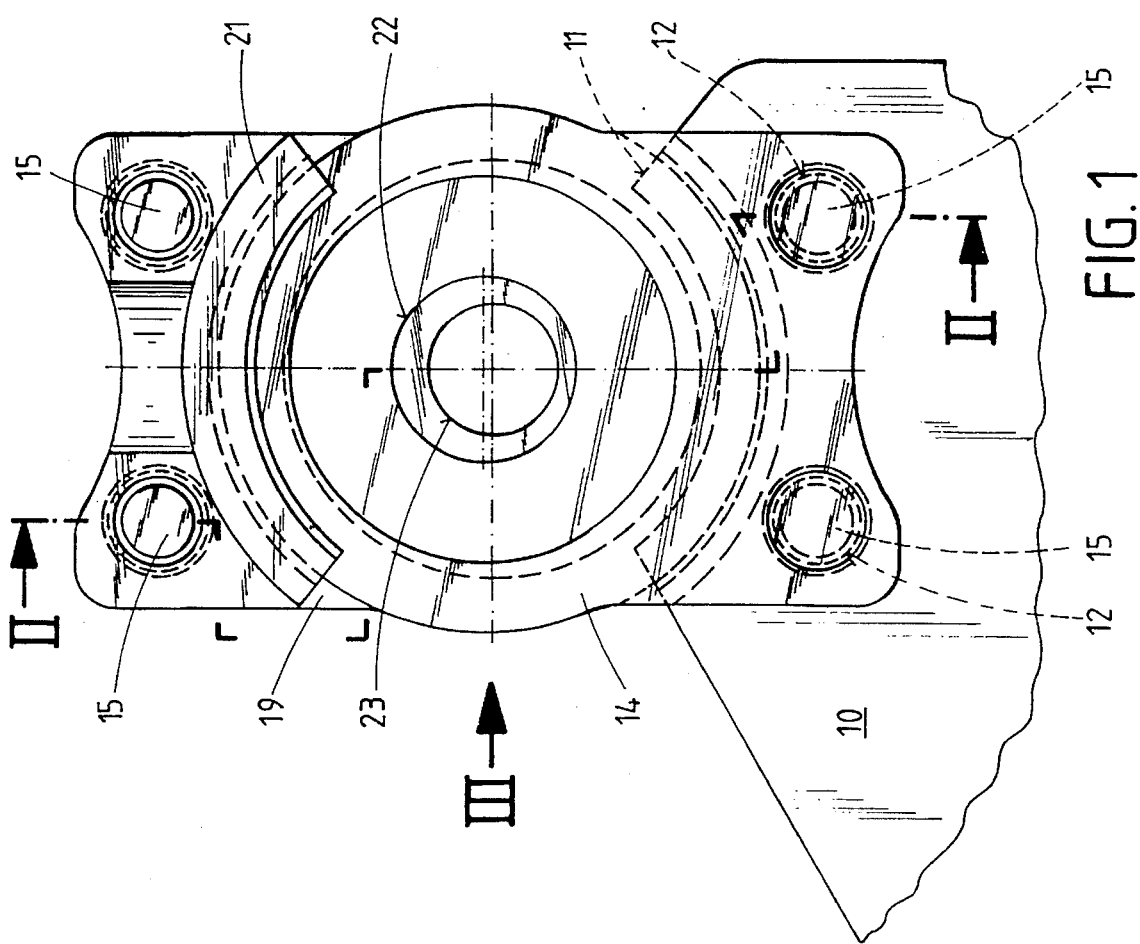
FIG. 1 shows a side view of an articulated fitting which is secured to the side cheek of a lower part of a seat and has a retaining section securing the articulated parts in the axial direction.
Figure 4:
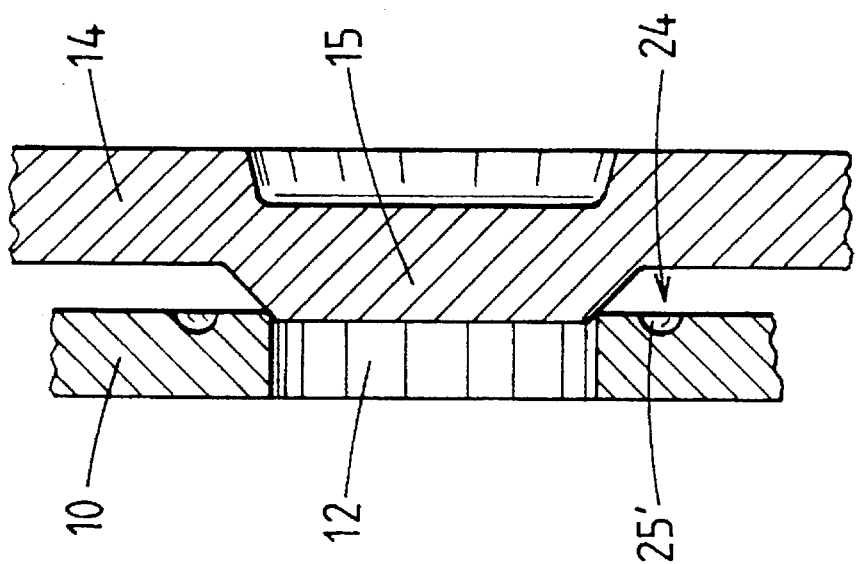
FIG. 4 is a partial cross-sectional view of the bevel region of two structural component parts to be connected with one another immediately before the welding process in which the structural component part having the hole which receives the bevel has an annular depression proceeding in the radial direction from the receiving hole for the bevel.
Figure 5:
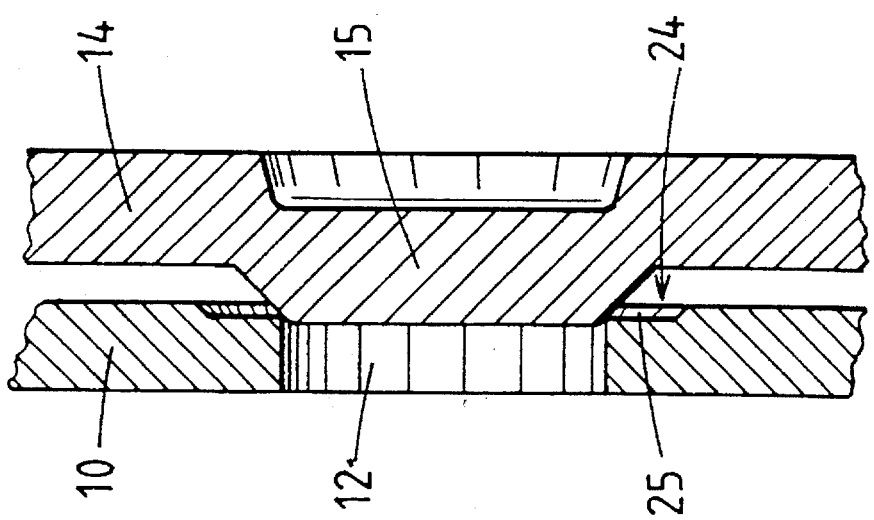
FIG. 5 shows the connection location in a view analogous to that shown in FIG. 4, but in which the collecting pocket, as radial depression, is arranged at a slight distance radially from the recess for the bevel.

The lower connection region of structural component parts 10 and 14 shown in FIG. 4 in a view similar to FIG. 2 shows the position of these structural component parts immediately prior to the welding process, the bevels 15 of structural component part 14 engaging very slightly in the recess 12 of structural component part 10. On the side of structural component part 10 which faces structural component part 14, this structural component part 10 has a collecting pocket 24 which is constructed in the embodiment form shown in FIG. 4 as an annular depression 25 surrounding the recess 12 and extends radially from the edge of the recess 12 while forming a free space between the side walls of structural component parts 10 and 14 which contact one another when connected, this free space receiving the material which is melted and displaced during the welding process. The embodiment form shown in FIG. 5 has a different construction and arrangement of the collecting pocket 24 on structural component part 10; specifically, the annular depression 25' is constructed as a groove, for example, and is arranged at a slight distance radially from the recess 12 in structural component part 10. It will be understood that the dimensions of the collecting pocket 24 depend upon the volume of material displaced in the welding process. The pressure applied beforehand to press together the structural component parts 10 and 14 exerts an influence on the position of the collecting pocket 24 as does the magnetic field acting around the electrodes. The collecting pocket can be arranged in the mating part as is shown in FIGS. 4 and 5. However, it is also conceivable to arrange the collecting pocket in structural component part 14 around the bevel 15. It is also possible to combine these steps.

Figure 8:
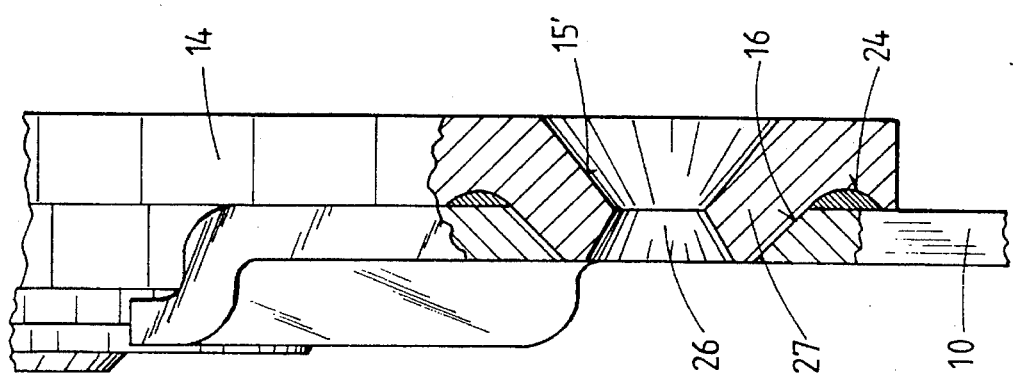
FIG. 8 is a view of the structural component parts shown in FIG. 7 in a view analogous to FIG. 7, but after the structural component parts have been connected in the welding process.
Figure 7:
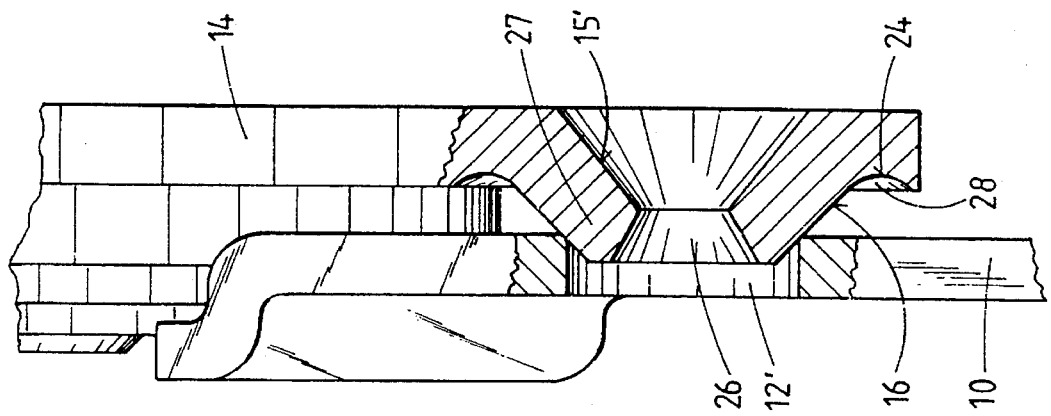
FIG. 7 shows a lower connection region of two structural component parts in partial section analogous to the view in FIG. 2, but with a modified bevel, showing both structural component parts in the position immediately before the welding process according to section line VII—VII of FIG. 6.
Figure 6:
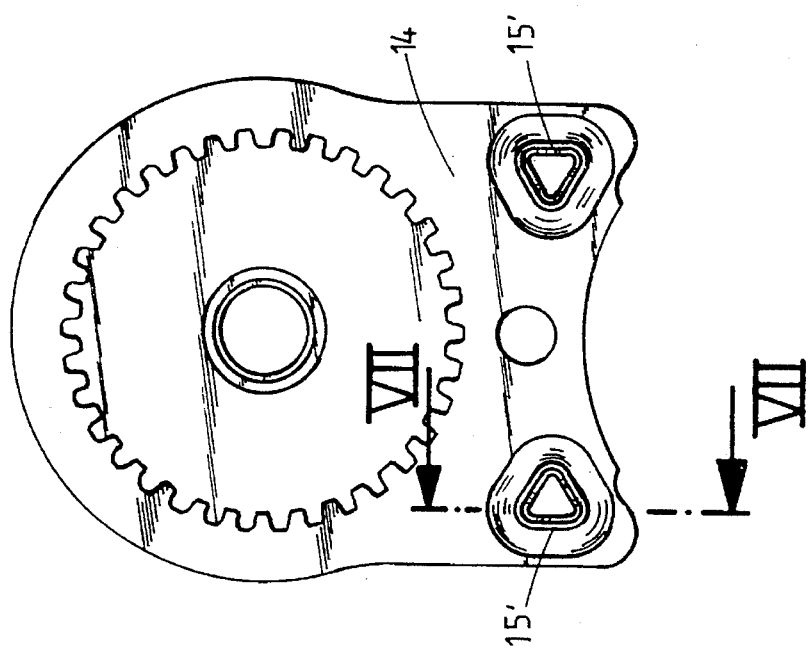
FIG. 6 shows a structural component part which is constructed as an articulated part having the bevels as viewed toward the bevel projections.

In the embodiment form shown in FIG. 6 in which the structural component part 14 is constructed as an articulated part, the bevels 15' are stamped out of structural component part 14 in such a way that they have a triangular circumference with a conical outer surface area. It will be understood that the recess 12' of structural component part 10 forming the mating part is shaped corresponding to the bevel 15' and is consequently similarly triangular. It will be seen from FIGS. 7 and 8 that the bevels 15' which are stamped out of structural component part 14 have a hole 26 in their center which benefits the stamping process on the one hand and reduces heat dissipation during the welding process on the other hand. The bevel 15' which, like the bevel 15 shown in FIGS. 2 to 5, has a conical circumferential surface area 16 due to its conical collar 27, has an annular depression 28 serving as a collecting pocket 24 at the base of its collar projecting from structural component part 14. FIG. 7 shows the initial position in the process for welding structural component parts 10 and 14, while FIG. 8 shows the connected state after the welding process in which the material displaced during the welding process is located in the collecting pocket 24.

The connection shown in FIG. 3 is brought about in that the structural component parts are first arranged in the position shown in FIG. 2, in which they are held by a mechanical spring-actuated contact pressing device which is not shown in the drawing. When a defined contact pressing force is achieved, the capacitor discharge for the welding process takes place. In so doing, a molten state is achieved in the region of contact by the high current strength and the high electrical resistance in the contact location so that the structural component parts are pressed together in the position shown in FIG. 3 by means of the contact pressing device mentioned above. At the same time, the bevels 15 are welded with the recesses 12. Since the heat is applied in the welding region only briefly and practically abruptly, the connected structural component parts are heated only mildly in comparison to other welding processes so that they are also free of distortion after the welding process.

As was already mentioned, the embodiment form shown in the drawing and described above is only an example of the subject matter of the invention which is in no way limited to this embodiment form. Rather, there are many conceivable modifications and different constructions of the subject matter of the invention. Moreover, all of the novel features mentioned in the description and/or shown in the drawings are substantial to the invention, even when not expressly claimed in the patent claims.

What is claimed is:

1. A connection assembly in adjusting devices for seats, wherein parts to be connected are welded to one another, comprising:

a structural first component part having a beveled projection on one side of said component part, said beveled projection having a first cross-section; and a structural second component part provided with a hole receiving said beveled projection of said first component part, said hole having a second cross-section geometrically similar to said first cross-section, at least one of said first component part and said second component part being provided, in a region about said beveled projection and said hole, with collector means including a collecting pocket for receiving material displaced from at least one of said first component part and said second component part during a capacitor impulse welding process, said collecting pocket being a substantially annular depression disposed in said second component part, said depression surrounding said hole and facing said first component part.

2. The connection assembly according to claim 1 wherein said beveled projection has a circumferential surface which tapers from an initial cross-section to an end face which is smaller than said initial cross-section, said hole having a uniform cross-section larger than said end face and smaller than said initial cross-section.

3. The connection assembly according to claim 1 wherein said beveled projection and said hole each have a circular cross-section.

4. The connection assembly according to claim 1 wherein said beveled projection and said hole,each have a polygonal cross-section.

5. The connection assembly according to claim 1 wherein said first component part has a plurality of beveled projections spaced from each other, said second component part having a plurality of holes equal in number to said beveled projections and disposed in an identical relative configuration as said beveled projections so that said holes receive respective ones of said beveled projections.

6. The connection assembly according to claim 1 wherein said annular depression communicates with said hole.

7. The connection assembly according to claim 1 wherein said annular depression is formed as a groove recessed into said second component part at a distance from said hole.

8. The connection assembly according to claim 1 wherein said beveled projection has a triangular cross-section and a conically tapered outer surface, said hole also having a triangular cross-section.

9. The connection assembly according to claim 1 wherein said beveled projection has a centrally located hole.

10. The connection assembly according to claim 9 wherein said beveled projection is stamped out of said first component part as a projecting conical collar.

11. The connection assembly according to claim 10 wherein said collecting pocket is disposed at a base of said conical collar.

12. A connection assembly in adjusting devices for seats, wherein parts to be connected are welded to one another, comprising:

a structural first component part having a beveled projection on one side of said component part, said beveled projection having a first cross-section; and a structural second component part provided with a hole receiving said beveled projection of said first component part at a weld region, said hole having a second cross-section geometrically similar to said first cross-section, said beveled projection having a surface which tapers from an initial cross-section to an end face which is smaller than said initial cross-section, said hole having a uniform cross-section larger than said end face and smaller than said initial cross-section, a collecting pocket in the form of a substantially annular depression being disposed in one of said first component part and said second component part and facing the other of said first component part and said second component part for receiving displaced material from at least one of said first component part and said second component part during a welding process, said depression surrounding one of said beveled projection and said hole.

13. The connection assembly according to claim 12 wherein said beveled projection and said hole each have a circular cross-section.

14. The connection assembly according to claim 12 wherein said beveled projection and said hole each have a polygonal cross-section.

15. The connection assembly according to claim 12 wherein said first component part has a plurality of beveled projections spaced from each other, said second component part having a plurality of holes equal in number to said beveled projections and disposed in an identical relative configuration as said beveled projections so that said holes receive respective ones of said beveled projections.

16. The connection assembly according to claim 12 wherein said annular depression communicates with said hole.

17. The connection assembly according to claim 12 wherein said annular depression is formed as a groove recessed into said second component part at a distance from said hole.

18. The connection assembly according to claim 12 wherein said beveled projection has a triangular cross-section and said surface is a conically tapered outer surface, said hole also having a triangular cross-section.

19. The connection assembly according to claim 12 wherein said beveled projection has a centrally located hole.

20. The connection assembly according to claim 19 wherein said beveled projection is stamped out of said first component part as a projecting conical collar.

21. The connection assembly according to claim 20 wherein said collecting pocket is disposed at a base of said conical collar.

* * * * *